(12) United States Patent
Bergman et al.

(10) Patent No.: US 6,408,300 B1
(45) Date of Patent: Jun. 18, 2002

(54) MULTIDIMENSIONAL INDEXING STRUCTURE FOR USE WITH LINEAR OPTIMIZATION QUERIES

(75) Inventors: Lawrence David Bergman, Mount Kisco; Vittorio Castelli, Croton on Hudson; Yuan-Chi Chang, White Plains; Chung-Sheng Li, Ossining; John Richard Smith, New Hyde Park, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/360,366

(22) Filed: Jul. 23, 1999

(51) Int. Cl.⁷ .............................................. G06F 17/30
(52) U.S. Cl. ......................... 707/101; 707/4; 707/100; 709/202
(58) Field of Search ................................ 707/1, 2, 3, 4, 707/100, 102, 101, 5, 7, 10, 501, 533, 202; 709/202

(56) References Cited

U.S. PATENT DOCUMENTS 6,134,541 A * 1/2000 Castelli et al. ................. 707/2
6,154,746 A * 11/2000 Berchtold et al. .......... 707/100

OTHER PUBLICATIONS

P. K. Agarwal, L. Arge, J. Erickson, P. G. Franciosa, and J. S. Vitter, "Efficient Searching with Linear Constraints," Proceedings of ACM PODS, pp. 169–177, 1998.

J. Goldstein, R. Ramakrishnan, U. Shaft, and J. Yu, "Processing Queries by Linear Constraints," Proceedings of ACM PODS, pp. 257–267, 1997.

T. M. Chan, "Fixed–dimensional Linear Programming Queries Made Easy," Proceedings of the 12th ACM Symposium on Computational Geometry, pp. 284–290, 1996.

J. Matousek and O. Schwarzkopf, "Linear Optimization Queries," Proceedings of the 8th ACM Symposium on Computational Geometry, pp. 16–25, 1992.

R. Seidel, "Linear Programming and Convex Hulls Made Easy," Proceedings of the 6th ACM Symposium on Computational Geometry, pp. 211–215, 1990.

G. B. Dantzig, "The Geometry of Linear Programs," Chapter 7, Linear Programming and Extensions, Princeton University Press, Princeton, NJ, pp. 147–157, 1963.

(List continued on next page.)

Primary Examiner—Jean M. Corrielus
(74) Attorney, Agent, or Firm—Robert P. Tassinari, Jr.; Ryan, Mason & Lewis, LLP (57) ABSTRACT

Linear optimization queries, which usually arise in various decision support and resource planning applications, are queries that retrieve top N data records (where N is an integer greater than zero) which satisfy a specific optimization criterion. The optimization criterion is to either maximize or minimize a linear equation. The coefficients of the linear equation are given at query time. Methods and apparatus are disclosed for constructing, maintaining and utilizing a multidimensional indexing structure of database records to improve the execution speed of linear optimization queries. Database records with numerical attributes are organized into a number of layers and each layer represents a geometric structure called convex hull. Such linear optimization queries are processed by searching from the outermost layer of this multi-layer indexing structure inwards. At least one record per layer will satisfy the query criterion and the number of layers needed to be searched depends on the spatial distribution of records, the query-issued linear coefficients, and N, the number of records to be returned. When N is small compared to the total size of the database, answering the query typically requires searching only a small fraction of all relevant records, resulting in a tremendous speedup as compared to linearly scanning the entire dataset.

15 Claims, 9 Drawing Sheets-

OTHER PUBLICATIONS

S.C. Fang and S. Puthenpura, "Linear Optimization and Extensions: Theory and Algorithms," Prentice–Hall, Inc., Englewood Cliffs, NJ, pp. 14–25, 1993.

F.P. Preparata and M.I. Shamos, "Computational Geometry: An Introduction," Springer–Verlag, pp. 125–134, 1985.

Johns Hopkins University, A. Das, S. R. Lele, G. E. Glass, T. Shields, and J. A. Patz, "Spatial modeling of vector abundance using generalized linear mixed models: application to Lyme disease, pp. 1–30".

* cited by examiner

MULTIDIMENSIONAL INDEXING STRUCTURE FOR USE WITH LINEAR OPTIMIZATION QUERIES

This invention was made with U.S. Government support under contract no. NCC5-305 awarded by the National Aeronautic and Space Administration (NASA). The U.S. Government may have certain rights in this invention.

FIELD OF THE INVENTION

The present invention relates to database systems and, more particularly, to constructing, maintaining, and utilizing a multidimensional indexing structure to answer linear optimization queries to a database containing records with numerical attributes.

BACKGROUND OF THE INVENTION

A linear optimization query is a special type of database query which returns database records whose weighted linear combination of numerical attributes are ranked as the top N records among the entire database, either maximally or minimally. Equivalently, a linear optimization query may be posed as the problem of finding data records whose weighted values are above or below a threshold. Out of the returned results, the top N records are then selected. While such a query may request the maximal or minimal N records based on a specific linear optimization criteria, the query processing algorithm does not require separate procedures for the two optimization conditions. This is because by simply reversing signs of weights in the linear equation, a maximization problem is translated into a minimization one, and vice versa. The present invention processes optimization queries in a similar way by translating them into maximization queries first.

Depending on application scenarios, weights (coefficients) of the linear criterion may or may not be known at the data ingestion time. Were they known during data ingestion time and remain constant, the weighted linear combination could be pre-computed and stored to answer future queries. In many cases, the coefficients are dynamic and the same set of data records are shared by different applications. Pre-computing for all applications thus may not be feasible. An emphasis of the present invention is on the dynamic cases where the coefficients are unknown and determined at the query moment. A goal of this invention is to index the records in an efficient way such that when a new query is issued, only a fraction of records in the database need to be evaluated to satisfy the query. Although its query response time may not be as fast as the response time of a static query, our invention narrows the performance gap between the two.

The linear optimization query is a general case of linearly weighted ranking, which is vastly applied in information retrieval and summarization. Instead of presenting a long table with all surveyed parameters of every record, useful information is often summarized by taking a linearly weighted combination of those parameters. The top N records are then listed and discussed. Examples of such information summarization can be found in many places. For example, every year, the news magazine US News and World Report conducts studies of college education and ranks the school performance by a linear weighting of numerical factors such as academic reputation (25%), faculty resources (20%), retention rate (20%), student selectivity (15%), financial resources (10%), alumni giving (5%), and graduation rate performance (5%). Top-ranking national and regional colleges are listed. One can find many similar examples such as cities with the highest cost of living, towns with the highest crime rate, the five hundred largest global companies, and so on. While all these examples are based on linearly weighted ranking, the coefficients assigned to the linear criterion are mostly static. The allocation of linear weighting may reflect the opinion of information collectors such as news agencies or consumer opinion groups. However, information subscribers like magazine readers do not actively participate in the information summarization process. We argue information subscribers should be active participants of the information retrieval and summarization process. In the above examples, linear weighting and record ranking can be performed at the request of readers and subscribers, perhaps through a personalized web page. College applicants should be able to choose a set of coefficients that reflect to their own valuation of a school. City residents should decide what cost of living index appears in the ranking criterion by their own life styles. One formula does not apply to all people.

Dynamic information summarization in the form of adjusting weights of the linear criterion has been practiced in many business and scientific applications. For example, mortgage companies and banks develop linear models to estimate consumers' credit scores, probabilities of mortgage repayment, default risk, etc. These models are often built on a common set of parameters such as loan-to-value ratio, length of credit history, revolving credit, credit utilization, debt burden and credit behavior. From this set of parameters, models for financial products may be developed. In the area of public health and environmental science, scientists extract parameters from satellite images, digital elevation maps, and weather data to model disease outbreak probabilities, rodent population, air pollution, etc. As an example, a group of researchers from Johns Hopkins University, A. Das, S. R. Lele, G. E. Glass, T. Shields, and J. A. Patz, developed a model of the distribution of the population of Lyme disease vectors in Maryland from Geographical Information System (GIS) digital images (See "Spatial modeling of vector abundance using generalized linear mixed models: application to Lyme disease," submitted to Biometrics for publication). Their models are frequently revised by applying different statistical analysis techniques and training data sets. In addition, scientists like to adjust their models to ask 'what if' questions. A speedy and accurate response from the database would greatly assist model development and verification.

The study of multidimensional indexing structures has been a major subject in database research. Indexing structures have been developed to answer different types of queries, including:

1. find record(s) with specified values of the indexed columns (exact query);
2. find record(s) that are within [a1 . . . a2], [b1 . . . b2], . . . , [z1 . . . z2] where a, b, and z represent different dimensions (range query);
3. find the K most similar records to a user-specified template or example (K-nearest neighbor query); and
4. find the top N records to a user-specified linear optimization criterion (linear optimization query).

Substantial work can be found to address the previous three types of queries, while much less is available in prior art about the fourth one. In prior art, linear optimization queries are often referred to the problem of finding a single data entry which maximizes or minimizes the given linear criterion, with the assumption that the constraints are given in the form of linear inequalities. In such cases, the feasible solution space is the intersection of half-spaces defined by those linear inequalities. When both the query and constraints are given at query time, the query processing problem is a linear programming problem. Solutions such as the simplex method and the ellipsoid method were well studied and references can be found in most linear programming textbooks. In addition, recent discovery in randomized algorithms suggested possible ways to reduce expected query response time. Seidel reported the expected time is proportional to the number of constraints (R. Seidel, "Linear programming and convex hulls made easy," Proceedings of the 6th ACM Symposium on Computational Geometry, pp. 211–215, 1990). When the constraints are given ahead of time to enable the preprocessing of records, query response can be made faster by trading off storage space. Matousek reported a data structure that is based on a simplicial partition tree, while parametric search is applied to prune the partition tree (J. Matousek and O. Schwarzkopf, "Linear optimization queries," Proceedings of the 8th ACM Symposium on Computational Geometry, pp. 16–25, 1992). Matousek provided complexity estimates on preprocessing time, storage space, and query response time. His work, however, does not suggest any direct extension to answer top-N linear optimization queries. Chan applied the same data structure while randomized algorithms are applied for tree pruning (T. M. Chan, "Fixed-dimensional linear programming queries made easy," Proceedings of the 12th ACM Symposium on Computational Geometry, pp. 284–290, 1996).

It is possible to apply data structures for linear constraint queries and post-process the outputs. The query processor does not search for the top-N records directly. Instead, it retrieves all records that are greater than a threshold. These records are then sorted to find the top-N answers. Studies in linear constraint queries tend to rely on spatial data structures such as R-tree and k-d-B tree. Algorithms are developed to prune the spatial partition tree to improve response speed. Examples of such studies can be found in the paper by J. Goldstein, R. Ramakrishnan, U. Shaft, and J. Yu, "Processing queries by linear constraints," Proceedings of ACM PODS, pp. 257–267, 1997 and the paper by P. K. Agarwal, L. Arge, J. Erickson, P. G. Franciosa, and J. S. Vitter, "Efficient searching with linear constraints," Proceedings of ACM PODS, pp. 169–177, 1998.

As will be evident, there are several major differences between the present invention and the prior art. First, for example, the invention applies a different indexing structure which solely depends on the geometric distribution of data records. Scaling, rotating, or shifting their attribute values has no effect on the indexed results while these operations significantly change those traditional indexing structures. Second, for example, the invention does not require a post-processing step to sort the output values while linear constraint queries do. Outputs are guaranteed to be returned in the order desired, which enables a form of 'progressive' retrieval. Third, for example, this invention enables a simple hierarchical organization of index to accommodate both global and localized queries. A database record typically contains both categorical and numerical attributes. A localized query is issued to search records from a single or multiple categories. On the other hand, a global query is issued to search records in the whole database. A solution to index the whole database must address both needs efficiently and avoid redundant storage. Our invention provides such a solution.

SUMMARY OF THE INVENTION

The present invention is directed to methods and apparatus for constructing, maintaining and utilizing a multidimensional indexing structure for processing linear optimization queries. The present invention enables fast query processing and has minimal storage overhead. Experimental results show that a significant improvement on query response time has been achieved. For example, two orders of magnitude in speed-up over a linear database scan has been demonstrated in retrieving the top 100 records out of a million.

As is known, coefficients of a linear equation are given at the query moment, which prevents a database from pre-computing and storing the answer. An indexing structure therefore should be flexible to localize the fraction of the database which contains relevant data records. The present invention provides such an indexing structure that enables the reduction of query response time by selectively evaluating some of the data records rather than all of the records in the database.

In one aspect, the invention discloses layered convex hulls as the fundamental building block of this multidimensional indexing structure. We present algorithms that are used to construct, maintain, and utilize a layered convex hull to process queries. In addition, we disclose a hierarchical structure of layered convex hulls, which is built upon multiple convex hulls by selectively grouping them into a hierarchy. This hierarchical structure provides an efficient and scalable solution to both global and localized queries.

In this invention, a layered convex hull is constructed by dividing database records into multiple layers wherein at least a portion of an inner layer (preferably, the entire inner layer) is geometrically contained by (i.e., inside of) a preceding outer layer. That is, each of the layers represents a convex hull to all the records from the current layer inward. It is to be appreciated that while a preferred method of construction is to create layers from the outer layer inward, it is contemplated that one of ordinary skill in the art can create layers from the inner layer outward. The fundamental theorem of linear programming guarantees, based on a basic property of a convex hull, that the linear maximum and minimum of a set of points always happen at their convex hull. In a layered convex hull, every record belongs to a layer. The query processing of linear optimization evaluates records layer-by-layer until the requested number of records are returned. Returning records retrieved by the algorithm disclosed in this invention are ordered by the given linear criterion and therefore, the query processing may be stopped at any point. No further operations are needed to sort the returned results.

Advantageously, this invention enables a hierarchical indexing structure to accommodate both global and localized queries. Global queries apply to all of the data records in a database. Localized queries apply to some segments or categories of data records. The hierarchical structure is built upon multiple 'local' layered convex hulls by extracting their outer-most layers; constructing a layered convex hull from records of these outer-most layers; and storing the new hull as the 'parent' of the 'local' hulls. When a new query is issued, the query processor first locates the parent hull of the record segments of interest. Layers in the parent hull are then evaluated to discover if any of its local hulls need to be evaluated. For data records exhibiting dissimilar distributions, the hierarchical indexing structure is most effective in pruning the search space and confining queries to local hulls that are most relevant. Effective pruning further shortens query response time and improves performance.

In yet another aspect of the invention, methods and apparatus for storing records of layered convex hulls in a spherical shell representation are also provided.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

It is to be appreciated that the term "processor" as used herein is intended to include any processing device, such as, for example, one that includes a CPU (central processing unit). The term "memory" as used herein is intended to include memory associated with a processor or CPU, such as, for example, RAM, ROM, a fixed memory device (e.g., hard drive), a removable memory device (e.g., diskette), etc. In addition, the term "input/output devices" or "I/O devices" as used herein is intended to include, for example, one or more input devices, e.g., keyboard, for making queries and/or inputting data to the processing unit, and/or one or more output devices, e.g., CRT display and/or printer, for presenting query results and/or other results associated with the processing unit. It is also to be understood that various elements associated with a processor may be shared by other processors. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

Figure 1A:
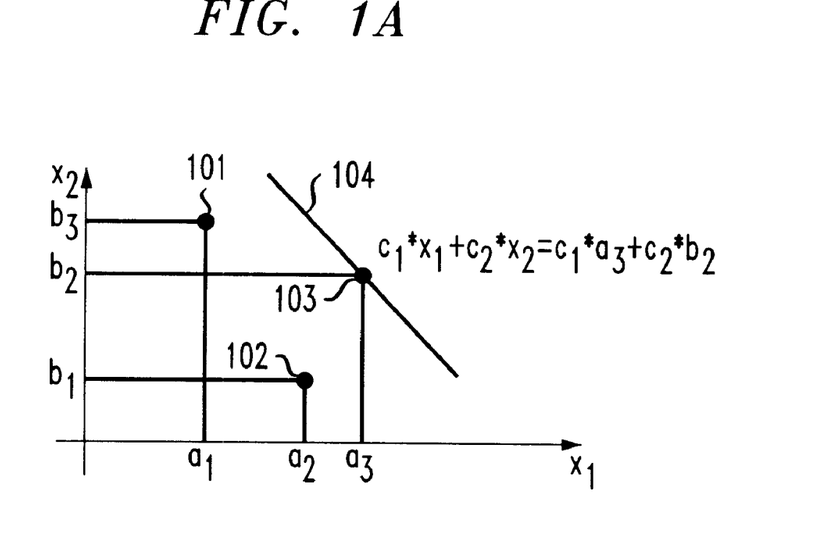
FIG. 1A is a graphical illustration of a problem solved by the present invention, i.e., linear optimization queries of data records.

FIG. 1A illustrates an example of a linear optimization query problem solved by this invention. In FIG. 1A, there are three data records 101, 102, and 103, each of which has two numerical attributes corresponding to the ordinate, $x_2$, and the abscissa, $x_1$. Creating a representation of the database as a set of tuples is well known in the art. The representation can be created by, but is not limited to: creating for each row of the database an array of length equal to the dimensionality of the tuple to be generated; and copying to the elements of the array, the values contained in the columns, of the corresponding row, for which the tuple must be generated. In this particular example, the dimensionality of the tuple is two. The invention, however, applies to any finite number of dimensions.

In FIG. 1A, data record 101 is represented by the 2-tuple $(a_1, b_3)$; data record 102 is represented by the 2-tuple $(a_2, b_1)$; and data record 103 is represented by the 2-tuple $(a_3, b_2)$. The linear criterion issued as a part of the query is shown as a line 104. When this line 104 passes the record 103, the line equation is written as $c_1*x_1+c_2*x_2=c_1*a_3+c_2*b_2$. Further, $(c_1*a_3+c_2*b_2)$ is the value of record 103 subject to the linear criterion. The objective of a linear optimization query is to find the top N data records which either maximize or minimize their values.

Figure 1B:
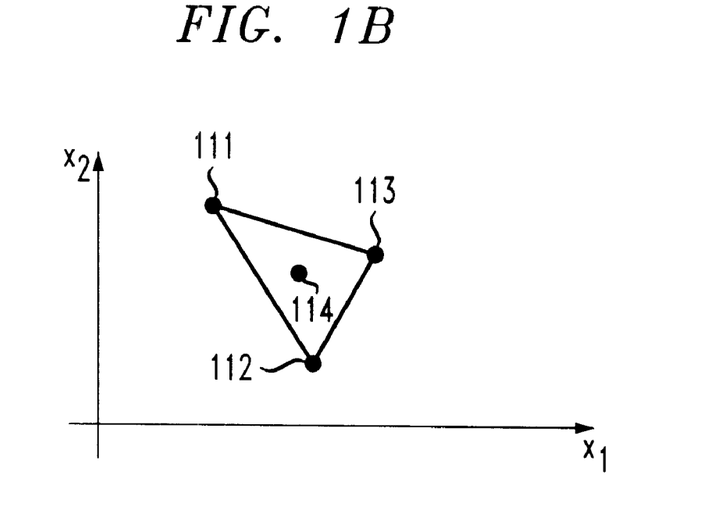
FIG. 1B is a graphical illustration of the convex hull of four data records in the two dimensional space.

FIG. 1B introduces the basic building block of this invention, i.e., convex hull. A convex hull is defined as the smallest convex region that encompass all the points. A region is convex if and only if for any two points in the region, a straight line connecting them also falls inside the region. Convex hull is a known art. For detailed discussions, please refer to the book by G. B. Dantzig, "Linear programming and extensions," Princeton University Press, Princeton, N.J., 1963. FIG. 1B depicts the convex hull of four data records in two dimensions. The three records, 111, 112 and 113, which appear at the boundary and can not be expressed as a convex combination of any other two distinct records in the convex region, are the vertices of this hull. The record 114, which resides inside the hull is not a vertex. Vertices are often referred to as extreme points in linear programming textbooks. In two dimensions, the shape of a convex hull is a polygon. In higher dimensions, its shape is a polyhedron.

The fundamental theorem of linear programming (S. C. Fang and S. Puthenpura, "Linear optimization and extensions," Prentice-Hall, Inc., Englewood Cliffs, N.J., 1993) states that for a given set of records and a linear maximization (minimization) criterion, the maximum (minimum) objective value is achievable at least at one vertex of the convex hull formed by the input records. Therefore, if a query only requests one record to be returned, a single convex hull is sufficient to answer such queries. Most queries, however, request more than one record and a single convex hull is inadequate.

This invention addresses the aforementioned need by constructing a layered convex hull from input data records. A layered convex hull is a multi-layered structure in which each layer represents the shell of a convex hull. Outer layers wrap around inner layers like skins of an onion. A procedure for constructing a layered convex hull is illustrated as a flow diagram in FIG. 3. First, however, an exemplary hardware architecture for constructing, maintaining, and utilizing a multidimensional indexing structure formed in accordance with the invention is described in the context of FIG. 2.

Figure 2:
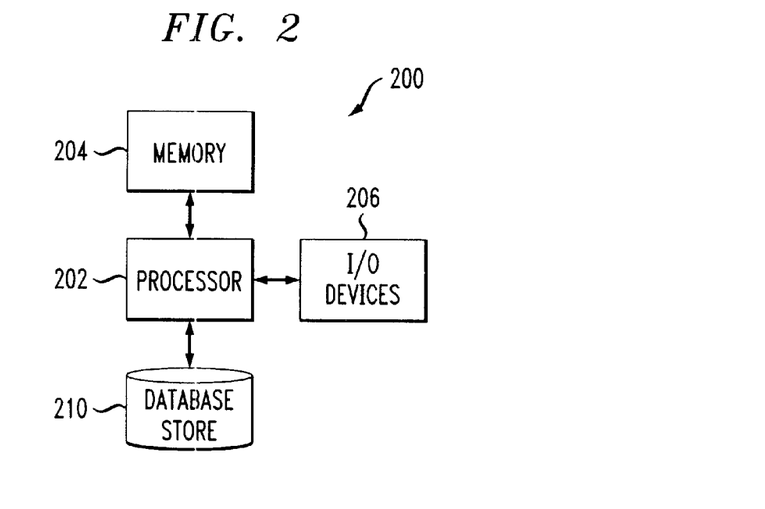
FIG. 2 is a block diagram of an exemplary hardware architecture for use with the methodologies of the present invention.

FIG. 2 illustrates apparatus 200 according to the invention which may be used for constructing, maintaining, and/or utilizing a multidimensional indexing structure according to the invention. For example, the multidimensional indexing structure may be a layered convex hull or a hierarchical layered convex hull, as will be explained in detail below. Also, the multidimensional indexing structure may be organized in a spherical shell representation, as will also be explained in detail below. The apparatus 200 includes a processor 202 coupled to memory 204, I/O devices 206, and database store 210. It is to be appreciated that the processor 202 controls and/or performs the methodologies, e.g., constructing, maintaining and utilizing, associated with the multidimensional indexing structure of the invention. Memory 204 is used by the processor 202 in performing such operations, e.g., storing a list of records returned by the processor in response to a particular query. I/O devices 206 may include a keyboard, a mouse, and/or any conventional data input device which permits a user to enter queries and/or other data to the system. I/O devices 206 may also include a display, printer, and/or any conventional data output device which permits a user to observe results associated with queries and/or other processor operations. Database store 210 may contain the database records in the form of one or more of the inventive multidimensional indexing structures and representations described herein. In such a configuration, the processor 202 accesses the database store 210 in response to a user query.

Figure 3:
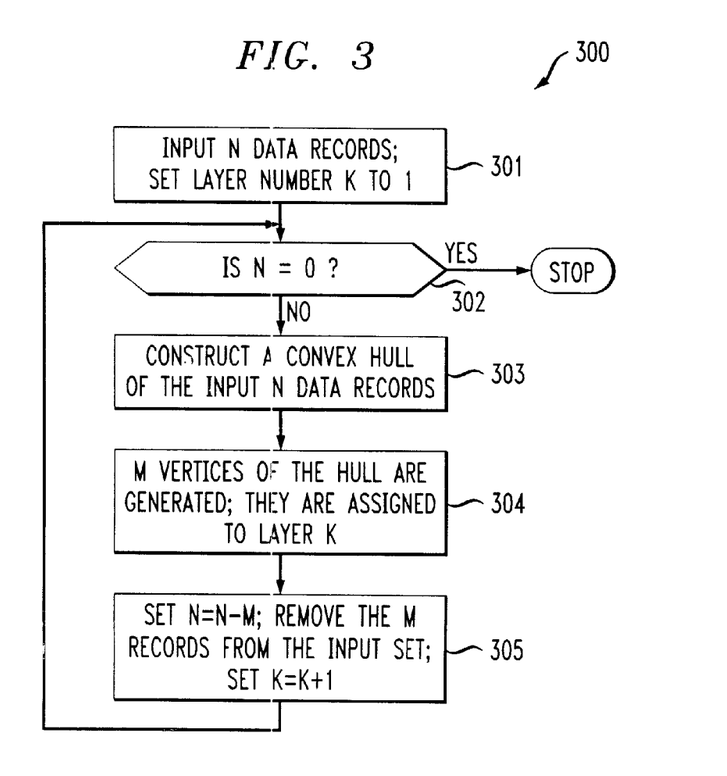
FIG. 3 is a flow diagram of a layered convex hull construction algorithm used to build a multidimensional indexing structure according to an embodiment of the present invention.

Referring now to FIG. 3, a procedure 300 for constructing a multidimensional indexing structure, i.e., a layered convex hull, is shown. Suppose N data records are given for indexing. The procedure initializes the layer number K to 1 in step 301. If N is zero, the index construction is complete (step 302). If N is nonzero, the procedure continues to step 303. In the first step, a convex hull of the input records is constructed (step 303). Convex hull construction schemes such as the gift-wrapping method, the beneath-beyond method and their variants can be found in the book by F. P. Preparata and M. I. Shamos, "Computational geometry: an introduction," Springer-Verlag, 1991. Convex hull construction is a known art and is not part of this invention. In the second step, M vertices generated from the first step are assigned and stored in layer K (step 304). M can be any integer between N and the dimensionality plus one. In the third step, remove the records of the M vertices from the input data set; decrease N by M; and advance K by 1 (step 305). The iteration continues until every input record is assigned to a layer.

In a layered convex hull, records in layer K are vertices of the convex hull formed by records from layer K, layer K+1, layer K+2, to the inner-most layer. Data records are indexed by which layers they belong to. The outer-most layer is layer 1. The layer below it is layer 2. Geometrically, inner layers are 'wrapped' by outer layers. Advantageously, this indexing structure built from a layered convex hull has no additional storage space requirement except for layer labels.

Figure 4:
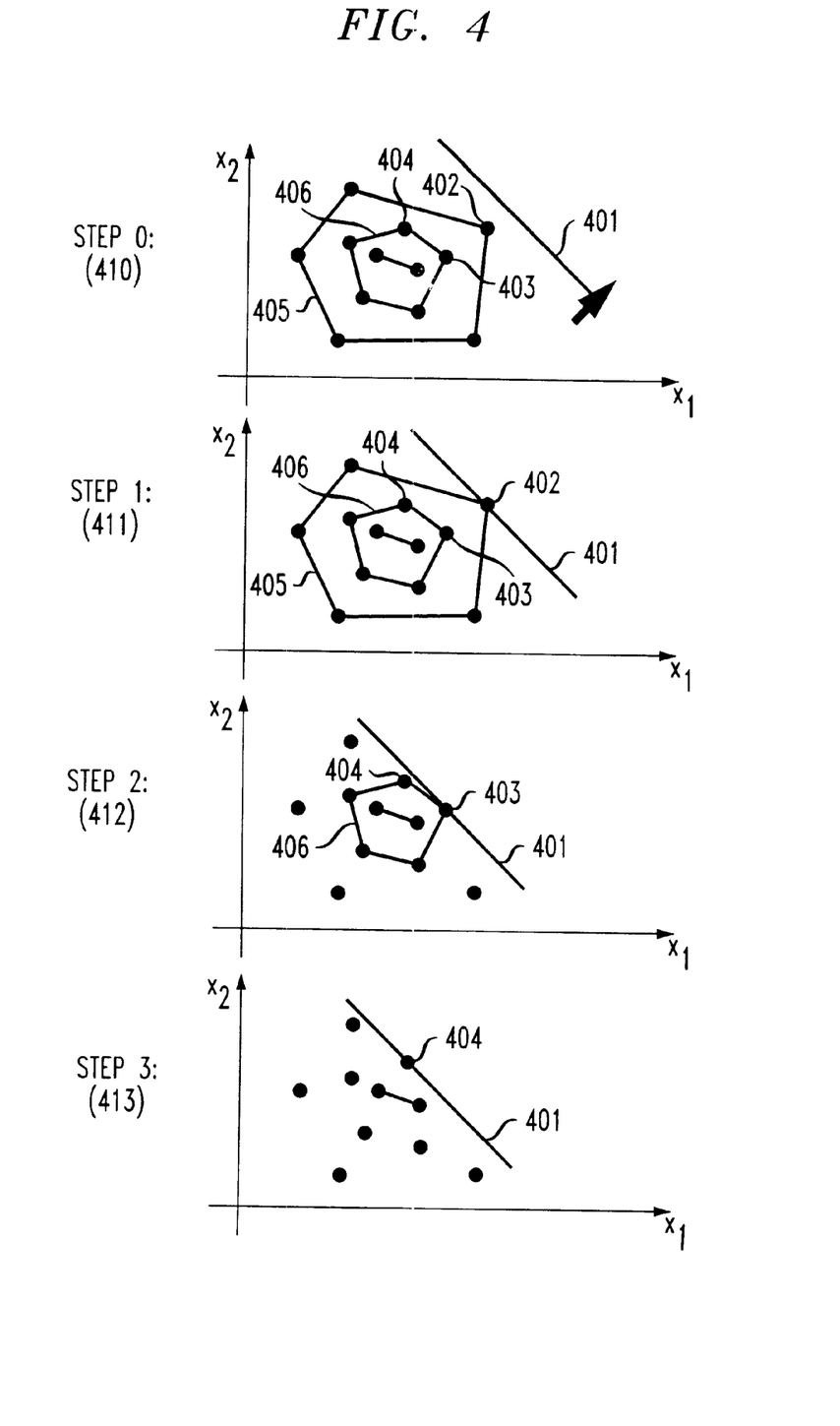
FIG. 4 is a graphical illustration of a query processing procedure on a layered convex hull according to an embodiment of the present invention.
Figure 5:
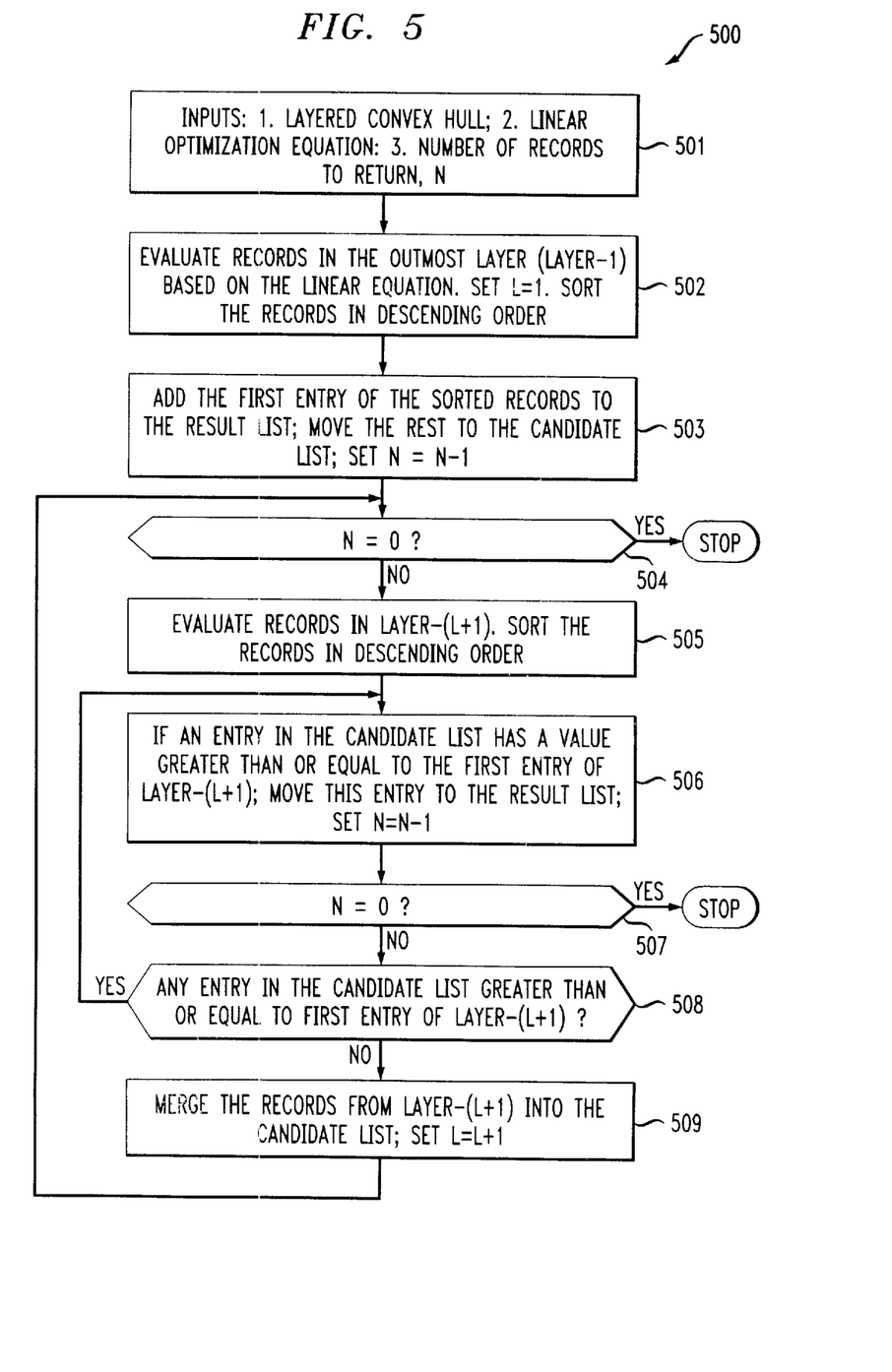
FIG. 5 is a flow diagram of a query processing procedure on a layered convex hull according to an embodiment of the present invention.

FIG. 4 illustrates a query processing procedure using an example of a layered convex hull, while a formal procedure is described by a flow diagram in FIG. 5. In FIG. 4, the progressive retrieval of three records satisfying a linear optimization query is shown in four steps: Step 0 (410), Step 1 (411), Step 2 (412), and Step 3 (413). In Step 0, a three-layered convex hull in the two dimensional space is shown. Both layer 1 (405) and layer 2 (406) have five records, each of which is represented by a black dot in the figure. The linear criterion 401 is to maximize record values along the direction of the arrow. In Step 1, the query processor (e.g., processor 202 in FIG. 2) starts by evaluating records in layer 1 (405) and finds that record 402 has the maximum value. Record 402 is returned to the client (e.g., via I/O device 206 on FIG. 2) and the procedure proceeds to Step 2. Notice in Step 2, record 402 has been removed from the picture. The query processor then evaluates records in layer 2 (406). Record values of layer 2 are compared with values of the four records left in layer 1. It is found that record 403 from layer 2 is maximal. Record 403 is returned to the client and the procedure proceeds to Step 3. Again notice in Step 3, record 403 has been removed from the picture. In Step 3, record 404 is maximal among all records and it is returned. From Step 1 to 3, the query processor evaluates records layer by layer, starting from the outer-most one.

FIG. 5 provides a formal flow diagram description of the query processing procedure 500 used in FIG. 4. The inputs to the procedure include: a layered convex hull indexing structure, the linear optimization criterion, and the number of records to return, N (step 501). Without loss of generality, we assume the optimization criterion asks for maximum records. Starting from the outer-most layer (layer 1), records are evaluated and sorted in descending order (step 502). The first entry (maximum) is returned to the result list, which is used to store returning records (step 503). The rest of entries from layer 1 are moved to the candidate list (step 504). The candidate list stores sorted records which have been evaluated. The list grows longer as the query processor traverses more layers.

The test boxes, 504 and 507, are terminating conditions which stop the program as soon as N records are returned. If the condition 504 is not satisfied, the query processor evaluates and sorts records in the layer below the current layer, layer (L+1) (step 505). A key part of the whole process is the inner loop composed of blocks 506, 507 and 508. Entries in the candidate list are compared with the first (also the largest) entry from layer (L+1). Entries in the candidate list greater than or equal to that are returned as results and N is set to N−1 (step 506). The loop continues until none in the candidate list is greater than or equal to the largest entry from layer (L+1) (steps 507 and 508). At that point, the loop is broken and all layer (L+1) records are merged into the candidate list (step 509). L is increased by 1 and the accessed layer is taken one step further inwards.

A query processor implemented based on the flow diagram in FIG. 5 has been tested. Initial experimental results indicated that for small N, significant speedup compared to linear search in query response time can be achieved.

A new indexing structure must cover all aspects of operations: construction, query processing and updates. FIGS. 3 and 5 illustrate the first two aspects, respectively. Flow diagrams of updating operations are presented in FIGS. 6 and 7.

Figure 6:
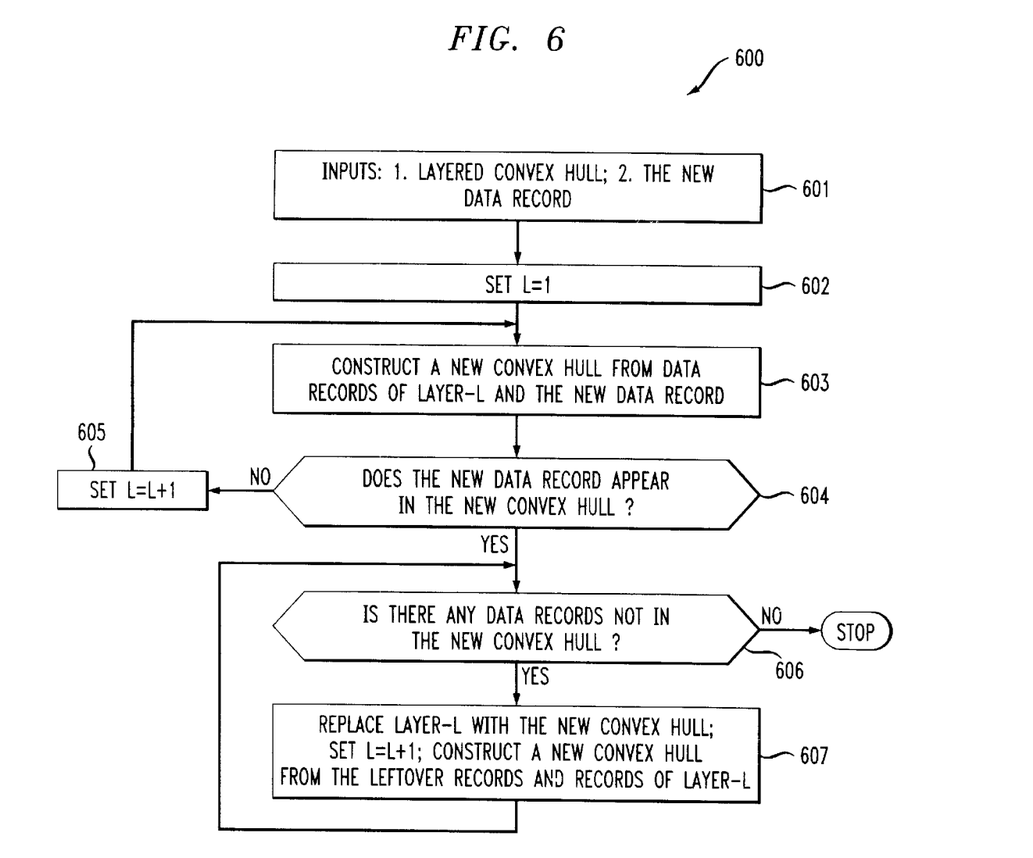
FIG. 6 is a flow diagram of a method of adding a new data record to an existing layered convex hull according to an embodiment of the present invention.

FIG. 6 illustrates how a new data record is indexed and added to an existing layered convex hull. By the definition of convex hull, any new data record that can be expressed as a convex combination of distinct records must be inside the convex hull. If a new record were inside the hull, the vertices of the hull with the new record would be identical to the vertices of the hull without the new record. On the other hand, if a new record were outside of the hull, the set of new vertices would be different. FIG. 6 describes how this concept may be realized in the context of procedure 600. The inputs to the adding procedure include an existing layered convex hull and a new data record (step 601). Start at the outer-most layer by setting L equal to one (step 602). Construct a new convex hull using data records from layer L and this new record (step 603). If the new record appeared in the new set of vertices (step 604), it means the record is outside of layer L and all layers inward need updating. Otherwise, move to the layer below (step 605) and repeat steps 603 and 604. Once layer L has been identified at step 604, the updating procedure enters into a loop formed by steps 606 and 607. Adding a new record to a layer may cause some records in the layer to be expelled, meaning they are no longer vertices. These expelled records are then pushed inwards to the layer below (step 607). The loop continues until no more records are expelled or the procedure reaches the inner-most layer.

Figure 7:
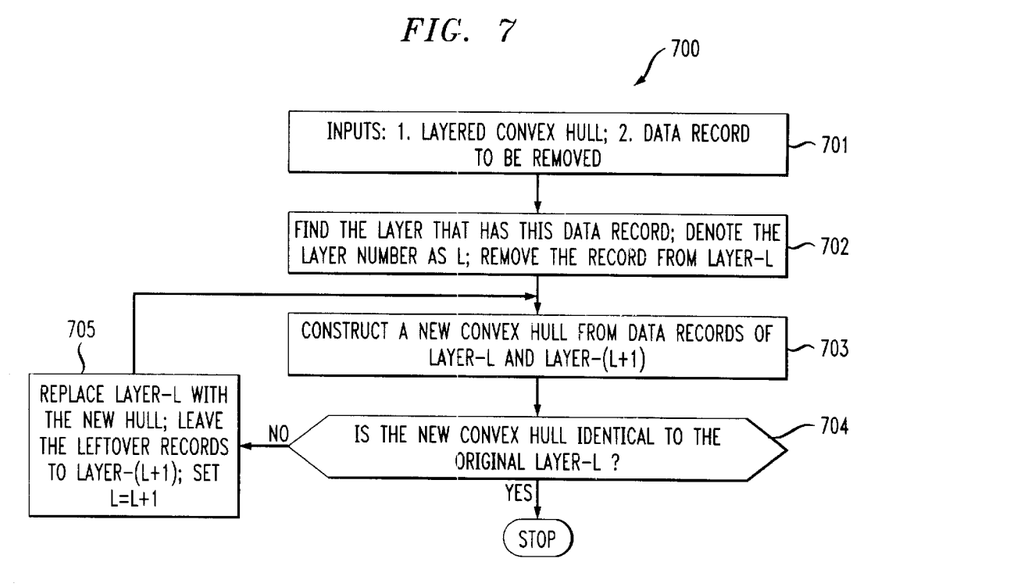
FIG. 7 is a flow diagram of a method of removing a data record from an existing layered convex hull according to an embodiment of the present invention.

Another important updating operation is the removal of data records. FIG. 7 illustrates how an existing record can be removed from its layered convex hull in the context of procedure 700. The inputs to the removal procedure include the data record to be removed and its layered convex hull (step 701). The first step is to find the layer which the record belongs to (step 702). This record is then removed. Denote its layer number as L. The remaining data records in layer-L are no longer guaranteed to be vertices of a convex hull that contains records in inner layers. An iterative procedure is thus provided to update layer-L and all layers below it. The iterative procedure starts by constructing a new convex hull from data records of layer-L and layer-(L+1) (step 703). The vertices of the new convex hull are compared to the records in layer-L (step 704). If they are identical, the program stops. If not, the vertices of the new hull are stored as layer-L (step 705). These vertices are removed from the set of layer-L and layer-(L+1). Records leftover are assigned to layer-(L+1). Increase L by one and the iteration continues.

The description of this invention so far has been focusing on operations related to a single layered convex hull. While this new indexing structure enables significant performance improvement, even fuller utility is revealed in its ability to accommodate both global and localized queries.

In many cases, records in a database contain both categorical and numerical attributes. Categorical attributes such as names, addresses, nations, states and professions are often used to limit the scope of search in the form of localized queries. For example, the college survey that appeared in US News and World Report has separate rankings for national and regional colleges; residents in New York may be interested in the pollution ranking of counties in New York only but not the whole nation; tourists planning a trip to Asia only wish to find out most costly cities in Asia. An effective indexing structure should take into account the categorical data in order to fulfill the requests of both global and localized queries.

A single layered convex hull for the whole database may not suitable for such tasks since it is built on numerical attributes only. In the aforementioned examples, the pollution ranking of counties in New York will be processed by generating the ranking from all 50 states and then removing the records of 49 states. The college ranking of mid-western universities will be filtered from a ranking list of colleges in the entire nation. Most costly cities in Asia are found from a list of cities all over the world.

Figure 8:
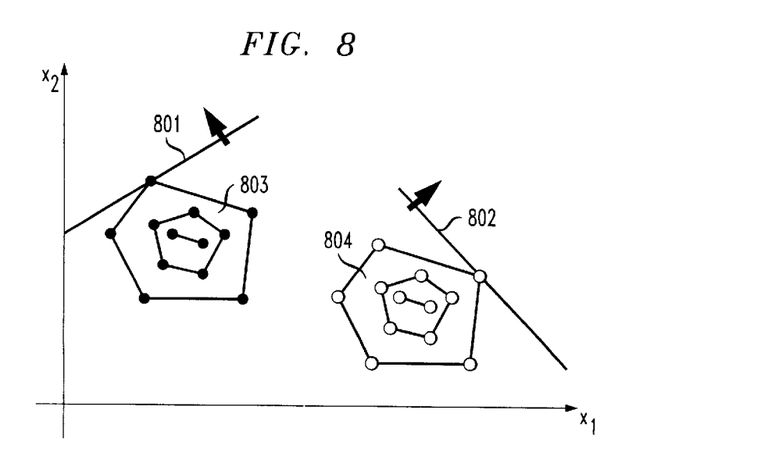
FIG. 8 is a graphical illustration of two categories of data records with distinct attribute values.
Figure 9:
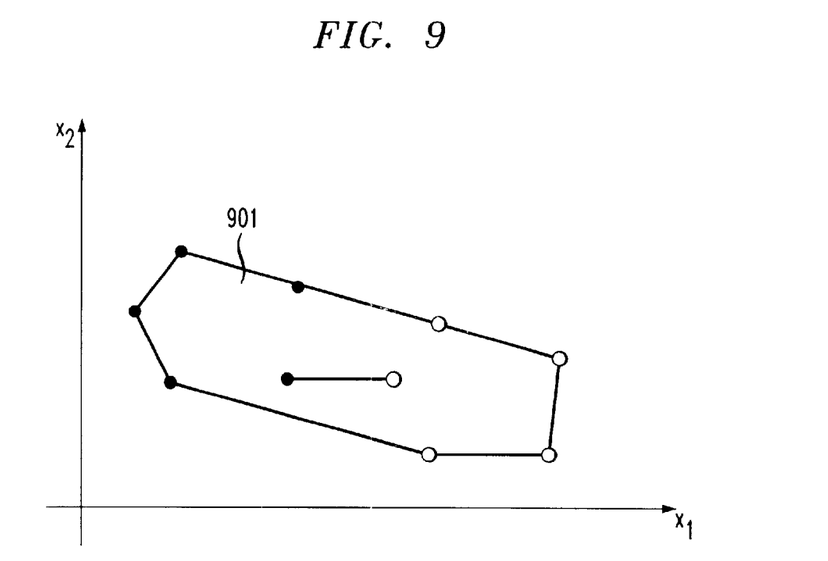
FIG. 9 shows a parent layered convex hull constructed from layer-1 data records of a pair of child convex hulls.

In another embodiment, the invention presents a solution to accommodate global and localized queries alike. The solution is built upon the inventive fundamental building block explained above, i.e., layered convex hulls. The idea is to organize layered convex hulls hierarchically. FIG. 8 and FIG. 9 illustrate the basic concepts.

In FIG. 8, there are two categories of data expressed in black and white dots. A layered convex hull is constructed for each and denoted as 803 and 804, respectively, in FIG. 8. A query issued to the black category can be processed by retrieving the black convex hull 803, while a query issued to the white category can be processed by retrieving the white convex hull 804. Processing both localized queries does not incur additional overheads. But what if a query is issued to both black and white categories? Constructing a third layered convex hull from all data records is sufficient to answer such global queries. However, this also implies that twice as much storage space would be needed.

Notice in FIG. 8, due to the distinct distribution of black and white records, a linear optimization query may only visit most records from a single category. For example, a linear query shown as a line 801 is likely to be answered by records in the black category (803) Similarly, a linear query as line 802 is likely to be answered by white records (804). The example in FIG. 8 illustrates the possibility of pruning the search space by identifying the set of layered convex hulls that are most relevant to the query and ignoring other irrelevant convex hulls. This concept is realized in hierarchical layered convex hulls according to the invention.

FIG. 9 illustrates an example of hierarchical layered convex hull. The layered convex hull 901 is formed from the layer-1 records of convex hulls 803 and 804 of FIG. 8. We refer to the new hull 901 as the parent hull of the child hulls 803 and 804. With a small overhead of replicating layer-1 records from child hulls, a parent hull serves the purpose of pruning search space. A query issued to both of its child hulls will be processed from the parent hull first to reduce the number of child hulls needed to be visited.

Figure 10:
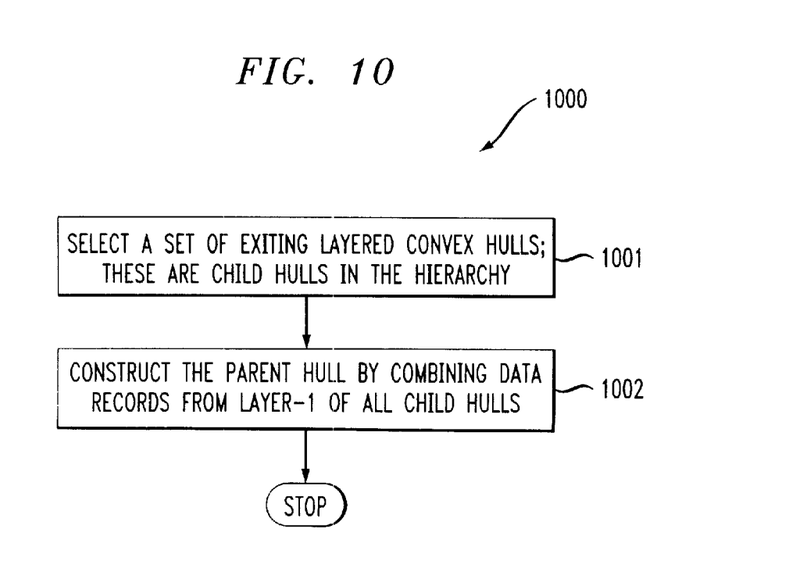
FIG. 10 is a flow diagram of a method of constructing a parent layered convex hull from a group of child convex hulls according to an embodiment of the present invention.

FIG. 10 is a flow diagram of a procedure 1000 for constructing a hierarchical structure of layered convex hulls. The first step is to select a set of existing layered convex hulls based on the pattern of client queries (step 1001). The selection criterion is not defined here because it depends on application domains. Layered convex hulls may be grouped by either categorical attributes like, for example, nations and regions or data segments like age 19 to 25 and age 26 to 40. The second step is to construct the parent layered convex hull from the records of layer-1 of child hulls (step 1002). The construction of the parent hull follows the procedure illustrated in FIG. 3 and will not be repeated here. Depending on client query patterns, multiple parent hulls may again be grouped using the same procedure in FIG. 10 to form a next-level parent hull. A hierarchical structure of layered convex hulls may be constructed in this fashion.

Figure 11A:
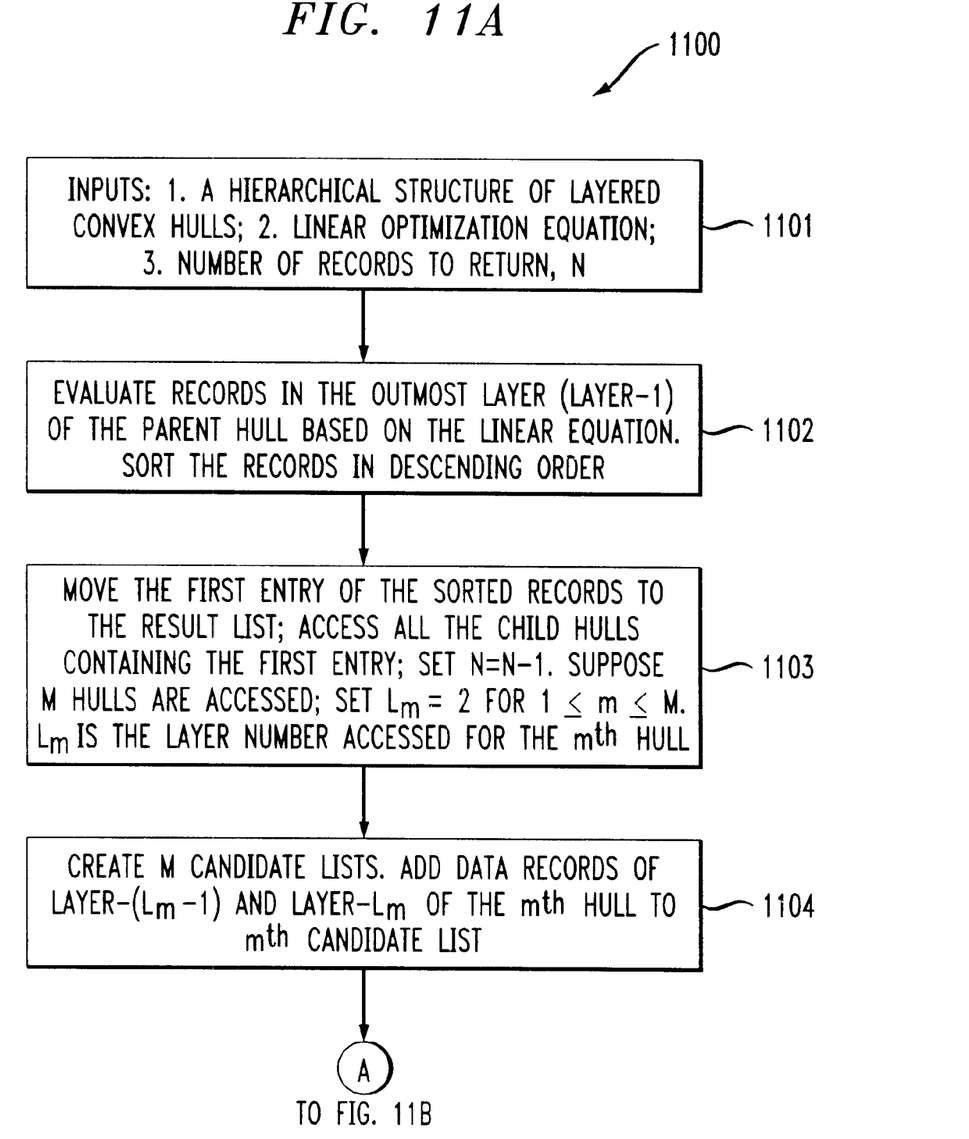
FIGS. 11A and 11B are a flow diagram of a query processing procedure on a hierarchical structure of layered convex hull according to an embodiment of the present invention.
Figure 11B:
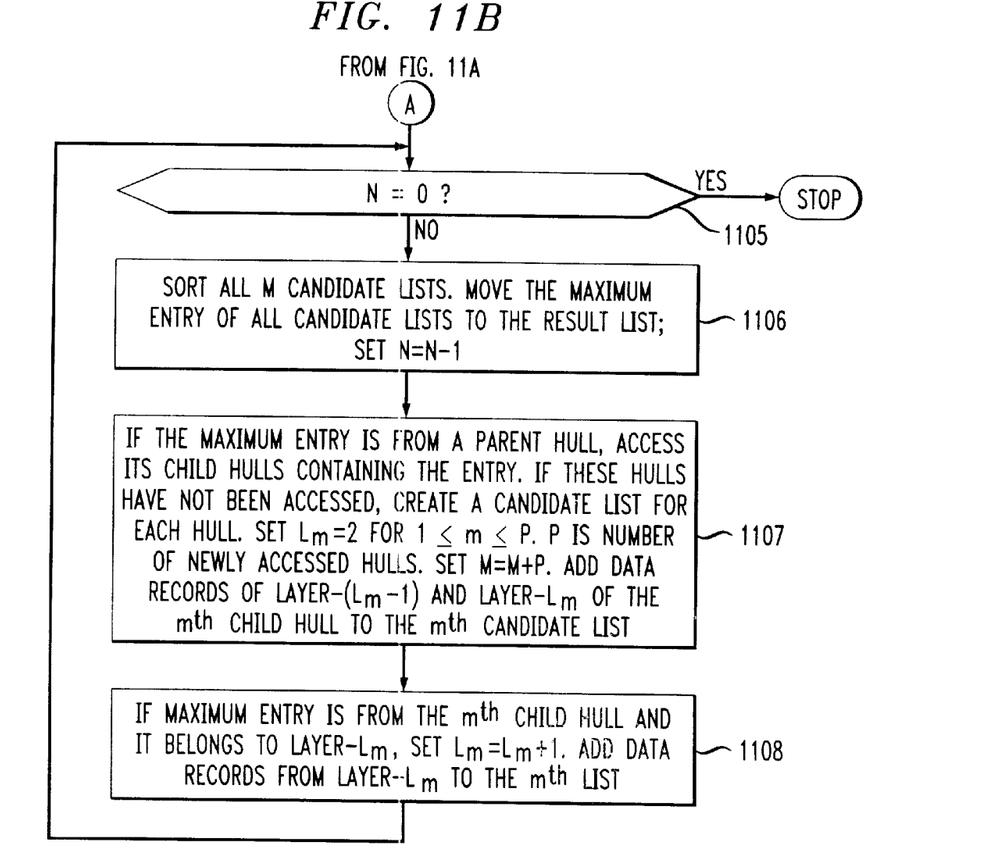

FIGS. 11A and 11B illustrate a flow diagram of a query processing procedure 1100 on a hierarchical structure of layered convex hulls. The inputs to the procedure include: a hierarchical structure of layered convex hull indexing structure, the linear optimization equation, and the number of records to return, N (step 1101). Without loss of generality, we assume the optimization criterion asks for maximum records. We assume the parent hull corresponding to the scope of the query has been located. Parent hull location mechanism depends on application domains and therefore is not specified here. As an example, in order to answer a query of finding top ranking colleges in the northeastern United States, the query processor needs to locate the parent hull that was built from layered convex hulls of colleges in the states of New York, Connecticut, Rhode Island, Massachusetts, New Hampshire, Vermont and Maine.

After the parent hull is located, records in its outer-most layer (layer-1) are evaluated and sorted in descending order (step 1102). The first entry of the sorted record is returned to the result list (step 1103). Decrease N by one. Access all the child hulls containing this entry. This usually means all the nodes (child hulls) on the path from the parent hull to the leaf node in this hierarchical structure. Assume a total of M hulls are accessed. Set $L_m$, the layer number assigned to the $m^{th}$ hull, to two. Create a candidate list for each accessed hull (step 1104) and add evaluated records from layer-$L_m$ and layer-($L_m$−1) to the me candidate list. In this query processing procedure, there are as many candidate lists as the number of hulls accessed. On the contrary, the query processing procedure of a single layered convex hull such as described in FIG. 5 only has one candidate list.

Next, the algorithm enters an iterative loop to retrieve the number of records requested. The loop is composed of blocks 1105, 1106, 1107, and 1108. If N is decreased to zero, the procedure stops (step 1105). If N is nonzero, the procedure proceeds to step 1106. The candidate lists are first sorted (step 1106) and the maximum record among all is moved to the result list. If the maximum entry is from a parent hull, its child hulls containing this entry need to be accessed (step 1107). The parent hull referenced here may be an internal node of the hierarchical structure rather than the 'root' of the structure. Its child hulls are the set of nodes belonging to the sub-tree rooted at the parent hull. If some of its child hulls have not been accessed, a new candidate list is created for each. The first two layers of data records are loaded into candidate lists. If the maximum entry is from the $m^{th}$ hull and it belongs to layer-$L_m$, increase $L_m$ by one (step 1108). Add data records from layer-$L_m$ to the $m^{th}$ candidate list. Go back to the checking box 1105.

The updating operations of the hierarchical structure of layered convex hulls are identical to the procedures described in the context of FIG. 6 and FIG. 7 for a single layered convex hull. The parent hull needs to be reconstructed only if layer-1 records of one or more of its child hulls are changed. A description of the procedures are not repeated here.

Figure 12:
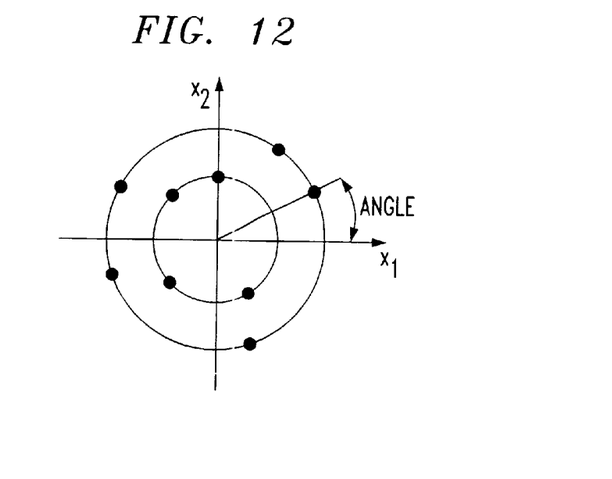
FIG. 12 shows a graphical illustration of storing records of a layered convex hull in spherical shells according to an embodiment of the present invention.

We now describe a procedure by which records in a layer may be organized (e.g., in database store 210 in FIG. 2) to further speed up query processing. Due to the basic properties of convex hulls, evaluating all the records in a layer will not only obtain the maximum but also the minimum subject to the linear criterion. Since the client request is about either one of them but not both, records in a layer shall be indexed to avoid a whole evaluation. One simple and effective solution is to apply spherical shells, which is illustrated in FIG. 12.

Spherical shells express layered convex hulls in concentric shells, each of which represents a layer. FIG. 12 illustrates the equivalent spherical shells of a two-layer convex hull in two dimensions. The polar coordinate of a data record is computed and only its angle is used to order the record. Since the radius of a record is not used, in spherical shell representation all data records in the same layer are shown equally distant from the origin in FIG. 12. In D dimensional space, the polar coordinate is expressed by the radius plus (D−1) angles. The spherical shell representation then orders records on a (D−1)-dimension sphere.

It is to be appreciated that the spherical shell representation may be used as an aid to the other methodologies of the invention described herein. The linear coefficients of the optimization query are first expressed in polar coordinates, e.g., (R, theta1, theta2, theta3, . . . , theta(D−1)). R is the radius, and the rest of the parameters are the angles. Instead of evaluating all data records in a layer, only those records are evaluated with angles in the range of {(theta1−90 degrees, theta2−90 degrees, theta3−90 degrees, . . . , theta (D−1)−90 degrees)} and {(theta1+90 degrees, theta2+90 degrees, theta3+90 degrees, . . . , theta(D−1)+90 degrees)}. When data records are uniformly distributed, the spherical shell representation can decrease the query response time by a factor of two.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of constructing an indexing structure for N input records associated with a database system, the method comprising the steps of:
   forming a first convex hull of the N input records, the first convex hull having vertices represented by M records wherein the M records are assigned to a first layer of the indexing structure; and
   forming a second convex hull of remaining N minus M records, the second convex hull having vertices represented by P records wherein the P records are assigned to a second layer of the indexing structure, wherein at least a portion of one of the layers is geometrically inside of another of the layers; and
   adding a new record to the existing index structure, wherein the adding step comprises the steps of:
      forming a first new convex hull of the records of the first layer and the new record;
      if the new record represents a vertex of the first new convex hull, updating the second layer by forming a second new convex hull of the remaining records; and
      if the new record does not represent a vertex of the first new convex hull, forming a third new convex hull of the records of the second layer and the new record.

2. The method of claim 1, further comprising the step of forming one or more subsequent convex hulls and assigning their respective vertices to subsequent respective layers of the indexing structure, wherein at least a portion of each subsequent layer is also geometrically inside the preceding layer, until the N input records have been assigned to a layer of the indexing structure.

3. The method of claim 1, further comprising the step of updating one or more subsequent layers wherein at least a portion of each subsequent layer is also geometrically inside the preceding layer.

4. The method of claim 1, wherein the layered convex hull may be organized in a spherical shell representation.

5. A method of constructing an indexing structure for N input records associated with a database system, the method comprising the steps of:
   forming a first convex hull of the N input records, the first convex hull having vertices represented by M records wherein the M records are assigned to a first layer of the indexing structure; and
   forming a second convex hull of remaining N minus M records, the second convex hull having vertices represented by P records wherein the P records are assigned to a second layer of the indexing structure, wherein at least a portion of one of the layers is geometrically inside of another of the layers; and removing an existing record from the existing index structure, wherein the removing step comprises the steps of:

identifying the layer that includes the existing record to be removed and deleting the record from the layer;

forming a first new convex hull of the remaining records of the identified layer and the records of the next inward layer;

if the first new convex hull is identical to the identified layer prior to removal of the record, end the removal operation; and if the first new convex hull is not identical to the identified layer prior to removal of the record, replace the identified layer with the first new convex hull and form a second new convex hull of the remaining inward records.

6. The method of claim 5, further comprising the step of updating one or more subsequent layers wherein at least a portion of each subsequent layer is also geometrically inside the preceding layer.

7. A method of constructing a hierarchical indexing structure for input records associated with a database system, the method comprising the steps of:

constructing a first child layered convex hull by:
  forming a first convex hull of N input records, the first convex hull having vertices represented by M records wherein the M records are assigned to a first layer;
  forming a second convex hull of the remaining N minus M records, the second convex hull having vertices represented by P records wherein the P records are assigned to a second layer, at least a portion of the second layer being geometrically inside of the first layer;

constructing a second child layered convex hull by:
  forming a first convex hull of Q input records, the first convex hull of Q input records having vertices represented by R records wherein the R records are assigned to a first layer of the second child layered convex hull;
  forming a second convex hull of the remaining Q minus R records, the second convex hull having vertices represented by S records wherein the S records are assigned to a second layer, at least a portion of the second layer of the second child layered convex hull being geometrically inside of the first layer of the second child layered convex hull; and constructing a parent layered convex hull by combining records from the first layer of the first child layered convex hull and the first layer of the second child layered convex hull.

8. Apparatus for constructing an indexing structure for N input records associated with a database system, the apparatus comprising:

at least one processor operable to form a first convex hull of the N input records, the first convex hull having vertices represented by M records wherein the M records are assigned to a first layer of the indexing structure, and to form a second convex hull of the remaining N minus M records, the second convex hull having vertices represented by P records wherein the P records are assigned to a second layer of the indexing structure, wherein at least a portion of one of the layers is geometrically inside of another of the layers and the at least one processor is further operable to add a new record to the existing index structure, and further wherein the adding operation comprises: (i) forming a first new convex hull of the records of the first layer and the new record, (ii) if the new record represents a vertex of the first new convex hull, updating the second layer by forming a second new convex hull of the remaining records, and (iii) if the new record does not represent a vertex of the first new convex hull, forming a third new convex hull of the records of the second layer and the new record.

9. The apparatus of claim 8, wherein the at least one processor is further operable to form one or more subsequent convex hulls and assign their respective vertices to subsequent respective layers of the indexing structure, wherein at least a portion of each subsequent layer is also geometrically inside the preceding layer, until the N input records have been assigned to a layer of the indexing structure.

10. The apparatus of claim 8, wherein the at least one processor is further operable to update one or more subsequent layers wherein at least a portion of each subsequent layer is also geometrically inside the preceding layer.

11. The apparatus of claim 8, wherein the at least one processor is further operable to remove an existing record from the existing index structure.

12. The apparatus of claim 11, wherein the removing operation comprises: (i) identifying the layer that includes the existing record to be removed and deleting the record from the layer, (ii) forming a first new convex hull of the remaining records of the identified layer and the records of the next inward layer, (iii) if the first new convex hull is identical to the identified layer prior to removal of the record, end the removal operation, and (iv) if the first new convex hull is not identical to the identified layer prior to removal of the record, replace the identified layer with the first new convex hull and form a second new convex hull of the remaining inward records.

13. The apparatus of claim 12, wherein the at least one processor is further operable to update one or more subsequent layers wherein at least a portion of each subsequent layer is also geometrically inside the preceding layer.

14. The apparatus of claim 8, wherein the layered convex hull may be organized in a spherical shell representation.

15. Apparatus for constructing a hierarchical indexing structure for input records associated with a database system, the apparatus comprising at least one processor operable to:

(i) construct a first child layered convex hull by:
  forming a first convex hull of N input records, the first convex hull having vertices represented by M records wherein the M records are assigned to a first layer;
  forming a second convex hull of remaining N minus M records, the second convex hull having vertices represented by P records wherein the P records are assigned to a second layer, at least a portion of the second layer being geometrically inside of the first layer;

(ii) construct a second child layered convex hull by:
  forming a first convex hull of Q input records, the first convex hull of Q input records having vertices represented by R records wherein the R records are assigned to a first layer of the second child layered convex hull;
  forming a second convex hull of the remaining Q minus R records the second convex hull having vertices represented by S records wherein the S records are assigned to a second layer of the second child layered convex hull, at least a portion of the second layer of the second child layered convex hull being geometrically inside of the first layer of the second child layered convex hull; and (iii) constructing a parent layered convex hull by combining records from the first layer of the first child layered convex hull and the first layer of the second child layered convex hull.

* * * * *